United States Patent [19]
Pech

[11] 3,929,350
[45] Dec. 30, 1975

[54] SAFETY DEVICE WITH AN INFLATABLE CUSHION, ESPECIALLY FOR AUTOMOBILES

[75] Inventor: Bernard M. Pech, Paris, France

[73] Assignee: Societe Nationale des Poudres et Explosifs, France

[22] Filed: Jan. 15, 1973

[21] Appl. No.: 323,954

[30] Foreign Application Priority Data
Jan. 19, 1972 France .................. 72.01803

[52] U.S. Cl. ......... 280/150 AB; 5/348 R; 182/137
[51] Int. Cl.² .......................................... B60R 21/08
[58] Field of Search ............. 280/150 AB; 5/348 R; 182/137, 138

[56] References Cited
UNITED STATES PATENTS

| | | | |
|---|---|---|---|
| 3,008,214 | 11/1961 | Foster et al. ................ | 5/348 R |
| 3,451,693 | 6/1969 | Carey ......................... | 280/150 AB |
| 3,642,303 | 2/1972 | Irish et al. .................. | 280/150 AB |
| 3,675,942 | 7/1972 | Huber ......................... | 280/150 AB |
| 3,715,130 | 2/1973 | Harada et al. ............... | 280/150 AB |
| 3,731,949 | 5/1973 | Radke ......................... | 280/150 AB |
| 3,733,091 | 5/1973 | Fleck et al. .................. | 280/150 AB |
| 3,752,501 | 8/1973 | Daniel et al. ................ | 280/150 AB |
| 3,762,741 | 10/1973 | Fleck et al. .................. | 280/150 AB |
| 3,792,873 | 2/1974 | Buchner ...................... | 280/150 AB |
| 3,795,414 | 3/1974 | Ventre ........................ | 280/150 AB |

*Primary Examiner*—Leo Friaglia
*Assistant Examiner*—John P. Silverstrim
*Attorney, Agent, or Firm*—Bucknam and Archer

[57] ABSTRACT

Safety device, especially for automobiles, comprises a collision detector controlling the actuation of a source of gas under pressure connected to at least one inflatable safety cushion, the cushion comprising two adjacent non-communicating chambers, maintained at different pressures at the time of use, the inner chamber communicating with the atmosphere via orifices with valves which open only in the direction which admits air into the said chamber, and an outer chamber connected to the said source of gas under pressure and enclosing, at least partially, the inner chamber, the walls of these two chambers being firmly fixed to one another in a discontinuous manner, the outer chamber playing the role of a device for spreading out the cushion when it is pressurised, and the inner chamber being spread out by pressurisation of the outer chamber and being pressurised itself by sucking in air from the atmosphere via the inlet orifices.

14 Claims, 7 Drawing Figures

SAFETY DEVICE WITH AN INFLATABLE CUSHION, ESPECIALLY FOR AUTOMOBILES

The present invention relates to protection devices which are located inside vehicles travelling at high speed, such as automobiles, aeroplanes and the like, and which are intended to protect the occupants of the said vehicles in the case of an accident involving sudden deceleration. These safety devices comprise an impact detector which actuates, within a very short response time, a source of gas under pressure which expands an inflatable cushion normally stored, with a small volume, in the dashboard.

Certain existing protection devices also contain an air inlet which plays a part in inflating the cushion at the same time as the gases under pressure, and, when this air is removed from the passenger compartment, it makes it possible considerably to decrease the wave of excess pressure generated by the very rapid increase in size of the inflatable cushion.

According to a first type of protection device, the air is admitted directly into the cushion via valves machined in the wall of the said cushion, which open when this wall is forced back by the injection of gas under pressure, creating a local reduction in pressure inside the cushion.

According to a second type of protection device, an air pump is inserted between the generator of gas under pressure and the inflatable cushion. In this case, the air introduced into the gas flow by the air pump is removed from the passenger compartment of the vehicle.

These different devices known hitherto introduce gases under high pressure and air which makes it possible to reduce the wave of excess pressure, simultaneously into a single chamber. These two fluids, in different physical states and very often of different chemical natures, form a mixture and it is no longer possible to use their respective properties during the operation of the safety device.

Furthermore, few existing inflatable cushions contain devices suitable for receiving the head of the person to be protected, although this safety point is very important. In effect, since the head is not so heavy as the bust, the forces of inertia will be such that the cushion will be depressed to a lesser extend at the level of the head and, because of this, the head will be thrown backwards relative to the position of the bust, and this is particularly dangerous. It is thus important to provide special characteristics in the region of the inflatable cushion which will come into contact with the head of the person to be protected.

Two solutions have been proposed for this purpose, the first consisting of giving the cushion a suitable external shape so that the bust of the person to be protected comes into contact with the said cushion before the head rests against it; the second solution involves arranging the wall of the cushion so that the head of the person to be protected can sink into the cushion more easily than can the rest of the body. This decrease in the force which holds the person in position is achieved by excess material forming a bulge in the region which will come into contact with the head. Since the radius of curvature is smaller in the region of the bulge, the forces exerted will be smaller despite the substantially uniform pressure prevailing inside the cushion. However, it should be noted that the development of the radius of curvature is very random during the use of the cushion; and that the particular deadening condition of the head are uncertain when the cushion is deformed.

The subject of the invention is thus a protection device, especially for automobiles, which makes it possible to overcome the disadvantages mentioned above.

For this purpose, such a device comprises a collision detector controlling the actuation of a source of gas under pressure connected to at least one inflatable safety cushion, the said cushion comprising two adjacent non-communicating chambers, maintained at different pressures at the time of use, namely: an inner chamber communicating with the atmosphere via orifices with valves which open only in the direction which admits air into the said chamber, and an outer chamber connected to the said source of gas under pressure and enclosing, at least partially, the inner chamber, the walls of these two chambers being firmly fixed to one another in a discontinuous manner; the outer chamber plays the role of a device for spreading out the cushion when it is pressurised, whilst the inner chamber is spread out by the pressurisation of the outer chamber and is itself pressurised by sucking in air from the atmosphere via the inlet orifices.

According to a first embodiment, the inflatable cushion consists of two walls arranged one inside the other and connected to one another in a discontinuous manner by fastenings or partitions which keep the said walls apart; the walls thus delimit two adjacent non-communicating chambers, an outer chamber connected to the source of gas under pressure and an inner chamber communicating with the atmosphere via air inlet orifices grouped in at least one leakproof contact zone between the said walls.

According to a second embodiment, the inflatable cushion consists of two walls of substantially equal dimensions, arranged one inside the other and attached to one another by discontinuous leakproof contact zones, preferably distributed over the entire area of the said walls; the walls delimit two adjacent non-communicating chambers, an outer chamber reduced to elementary volumes, all communicating with one another, and connected to the source of gas under pressure, and an inner chamber communicating with the atmosphere via air inlet orifices machined at the said discontinuous zones.

According to a characteristic of the invention, the region of the cushion which will come into contact with the head of the person to be protected is a leakproof contact zone between the two walls, and hence is at the pressure of the inner chamber, means seeking to counteract the forces being moreover provided to act on the outer chamber for the purpose of maintaining a pressure in this inner chamber which is always less than that prevailing in the said outer chamber during the cushion compression phase for deadening the person to be protected.

For this purpose, the region of the cushion which will come into contact with the head of the person to be protected consists of a portion of one of the walls which bounds the inner chamber.

Moreover, amongst the two walls of the cushion, at least the inner wall is made of an elastic material.

According to a variant, the components which keep the two walls apart from one another are made of an elastic material.

According to another characteristic of the invention, the air inlet orifices are equipped with membrane valves and, more particularly, the orifices and the membrane valves are produced solely by shaped cutouts in the two walls of the cushion.

According to a variant, the fastenings are of very short length so that the two walls are in direct contact with one another.

According to another characteristic, the leakproof attachment zones are produced by a physico-chemical process such as welding.

According to yet another characteristic, in the region where gas under pressure is admitted, the inner wall of the cushion is equipped with mechanical reinforcements which also facilitate the diffusion of the said gases.

Given that the inflatable cushions according to the invention possess two chambers, the pressurisation of the outer chamber will produce a padding since the holding zones are distributed over the entire surface of the cushion.

Whatever the source of gas under pressure used, the volume of gas necessary to inflate the cushion will be limited. If a reservoir of compressed gas is used, the storage problems are made easier. In the case of the use of a pyrotechnic generator, the outer chamber is only pressurised by this source, and this considerably restricts the amount of possibly toxic gases admitted. Since the inner chamber sucks in air from the passenger compartment, all the inlet orifices will thus be isolated from the volume of possibly unpleasant gas and no leakage is possible.

The use of this safety cushion makes it possible, moreover, to exert the maximum forces which hold the person in position only when the inner chamber is brought to a pressure greater than atmospheric pressure, by deformation due to the deadening of the person to be protected. When the person is thrown against the double-chamber cushion, the latter deforms easily since the inner chamber is at a low pressure because the air of the passenger compartment has been able to enter it only during the period when the cushion was expanding, that is to say a few 10's of milliseconds. This ease of deformation of the cushion makes it possible to obtain a large surface area of contact and, for an equal force which holds the person in position, this arrangement restricts the localised pressures to which the person to be protected is subjected.

The outer chamber is, moreover, held in shape by discontinuous holding zones, produced either by direct contact, or by components holding the two walls apart. The equilibrium position is achieved when the pressure forces acting on the outer chamber are equal to the opposing forces exerted by the walls on the gases. These opposing forces are due to the effects of contact of the holding zones and to the deformation of the walls which assume a padded appearance when the outer chamber is pressurised. Even when the person to be protected exerts a compression force on the safety cushion, the pressure in the outer chamber will be greater than the pressure of the inner chamber and this pressure difference will be particularly high if the inner wall of the inflatable cushion is elastic. This physical characteristic makes it possible to choose a geometrical arrangement for the cushion which allows the bust of the person to be protected to be brought into contact with the outer chamber and the head to be caused to rest on a surface at a lower pressure.

The invention is described in the text which follows with reference to the attached drawings in which.

Figure 1:
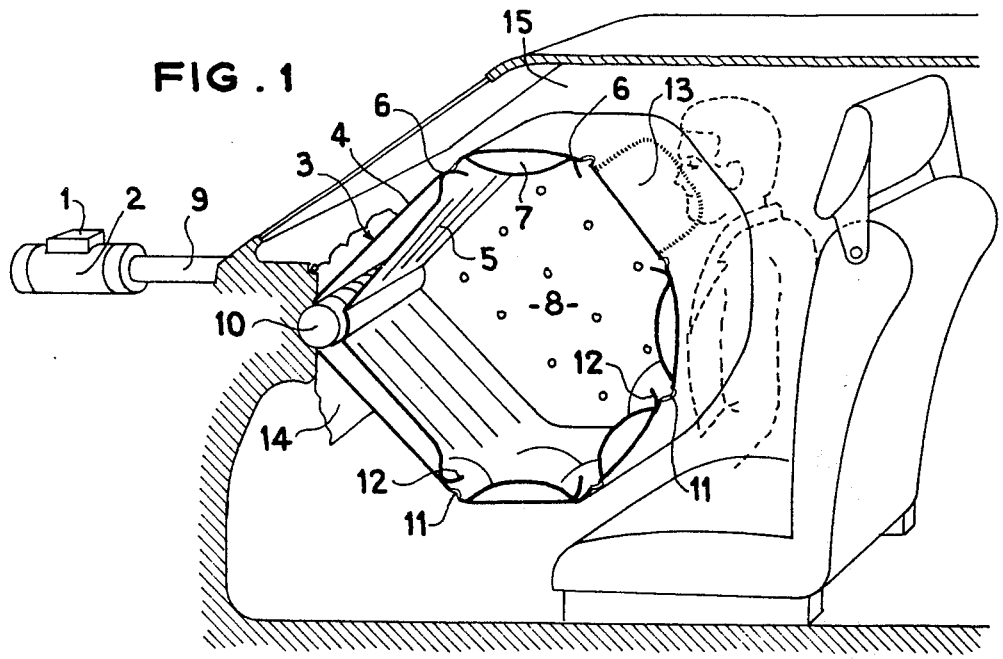
FIG. 1 is a view, in perspective, with part of the diagram removed, of the front part of an automobile equipped with the safety device according to the invention.

The safety device according to the invention, as it is represented in FIG. 1 of the drawing, comprises a collision detector 1 controlling the actuation of a generator of gas under pressure 2 connected to at least one inflatable safety cushion 3 which expands and interposes itself between the person to be protected and the structures of the vehicle which present the risk of injuring him during an accident. This cushion comprises two walls 4 and 5, made of a flexible material, of substantially equivalent dimensions, located one inside the other and connected to one another in a discontinuous manner by leakproof contact zones 6 produced, for example, by welding, gluing, sewing or any other suitable physico-chemical method.

These walls thus delimit two non-communicating chambers, namely:

an outer chamber 7 which goes practically all around the cushion and is connected to the said generator of gas under pressure 2, via the gas supply pipeline 9 and the diffuser 10, this outer chamber playing the role of a device for expanding the cushion when it is pressurised;

and an inner chamber 8 communicating with the atmosphere via temporary orifices of large cross-section 11 closed by valves, preferably of the membrane type, 12 which open only in the direction which admits air into the said inner chamber, the latter being expanded by the pressurisation of the outer chamber and being itself pressurised by sucking in the air surrounding the cushion via the inlet orifices 11.

Of course, these air inlet orifices 11, which make it possible for the inner chamber 8 to communicate with the air surrounding the cushion, can also be distributed over the entire surface of the cushion, excluding the zone 13 for receiving the head of the person to be protected, and they are surrounded, individually (FIGS. 1 and 6) or in groups (FIGS. 2 and 7), by a leakproof contact zone 6 which forms the discontinuous bonds by direct contact of the two walls and makes it possible to isolate the air inlet orifices from the outer chamber.

Figure 5:
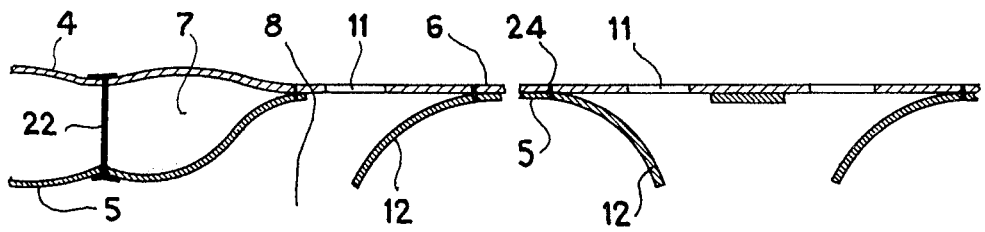
FIG. 5 is a partial cross-sectional view of a side panel of the cushion represented in FIG. 4.

In the case of an accident, the collision detector 1 applies a voltage to a circuit controlling the actuation of the gas generator 2 (it is immaterial whether this is a reservoir of gas under pressure or a pyrotechnic generator) and the gases liberated are conveyed via the tube 9 to the diffuser 10. A slight increase in pressure, for example of 3 bars, makes it possible to overcome the system 14 which holds the cushion in place; the safety cushion 3 can then spread out under the effect of the high rate of flow of gas which supplies only the outer chamber 7. The shaping and the expansion of this outer chamber creates a great reduction of pressure in the inner chamber 8, and this causes the air inlet orifices 11 to open temporarily by movement of the membrane valves 12 (FIG. 5). Admission of air surrounding the cushion takes place via these orifices and is maintained by the pressure difference which exists between the inner chamber 8 and the passenger compartment of the vehicle 15. This pressure difference results, on the one hand, from the reduction of pressure created in the inner chamber and, on the other hand, from the excess pressure which exists in the vicinity of the outer wall during the spreading-out phase.

When the expansion phase of the safety cushion is complete, admission of air into the inner chamber 8 nevertheless continues as long as the internal pressure is less than the calibration pressure of the valves 12, which is itself less than atmospheric pressure, because of the opposing force which is exerted on the membrane of the valve. In practice, the pressure reached is limited by the period of time which exists between the moment when the gases are liberated by the source and the moment when the person to be protected comes into contact with the safety cushion. This period of time is usually of the order of 15 to 100 milliseconds. By suitably distributing the positions of the air inlet orifices 11 which make it possible to have a means of communication between the inner chamber and the air contained in the passenger compartment of the vehicle, and by making these orifices of a suitable size, it is possible to obtain a variable pressure, at will, for example within the range of 0.6 to 0.9 bar. When the person comes into contact with the safety cushion, it will be possible for the latter to be deformed without meeting great resistance since only the outer chamber is pressurised in a range which can vary from 1.1 to 3 bars, the decrease in volume of the cushion brought about by contact with the person to be protected tending to increase the pressure in both the chambers.

For this purpose, the inner wall 5 can be made of an elastic material and, because of this, large opposing forces compress the gases contained in the outer chamber 7 even when the overall volume of this chamber is smaller because of this increase in pressure. Due to this elastic inner wall 5, a relatively high pressure difference is constantly maintained between the two chambers and a particularly valuable geometrical arrangement from the safety point of view can be achieved. In effect, it is possible to arrange the zone 13 which will come into contact with the head of the person to be protected in such a way on the double-chamber safety cushion that it is in contact with the inner chamber 8 at a reduced pressure via a bare and smooth wall. The bust, in contrast, is in contact with the outer chamber 7 and is thus subjected to a greater pressure as well as to opposing forces resulting from the deformation of the cushion relative to its resting position.

Figure 2:
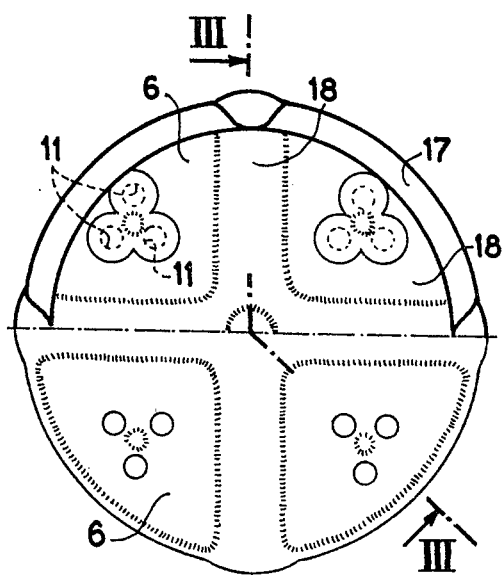
FIG. 2 is a cross-sectional view along II—II of FIG. 3 of a safety cushion according to the invention, which is designed to expand from the centre of the steering wheel of an automobile; only the upper half of the cushion is shown in cross-section.
Figure 3:
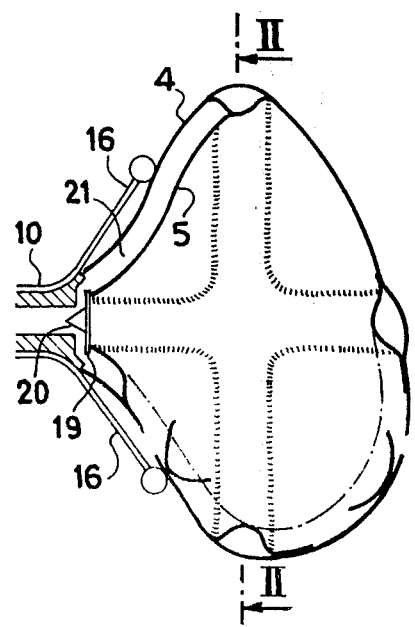
FIG. 3 is a cross-sectional view along III—III of the safety cushion represented in FIG. 2.

FIGS. 2 and 3 relate to an example of a cushion which is designed to expand from the centre of the steering wheel 16; the outer chamber 7 is reduced to a circumferential frame 17 on which seven radial arms 18 rest; this arrangement, together with the large curvature of the peripheral zone makes it possible for the cushion to move sideways and eliminates the risk of "punching" which is present in cushions with a single chamber; the shape of the outer chamber is achieved by forming leakproof contact zones 6, in the shape of quarters, delimiting the positions of the air inlet orifices 11 which make it possible to form a communication between the inner chamber 8 and the air surrounding the cushion. The inner wall is reinforced, moreover, in the gas inlet zone by a part 19 which provides a mechanical reinforcement and also facilitates the diffusion of the gases; this part is firmly fixed to the inner cone 20 of the diffuser and makes it possible to prevent local deformation of the inner wall in this region during the inflation phase. The neck 21 of the cushion is mounted directly on the body of the diffuser.

Figure 4:
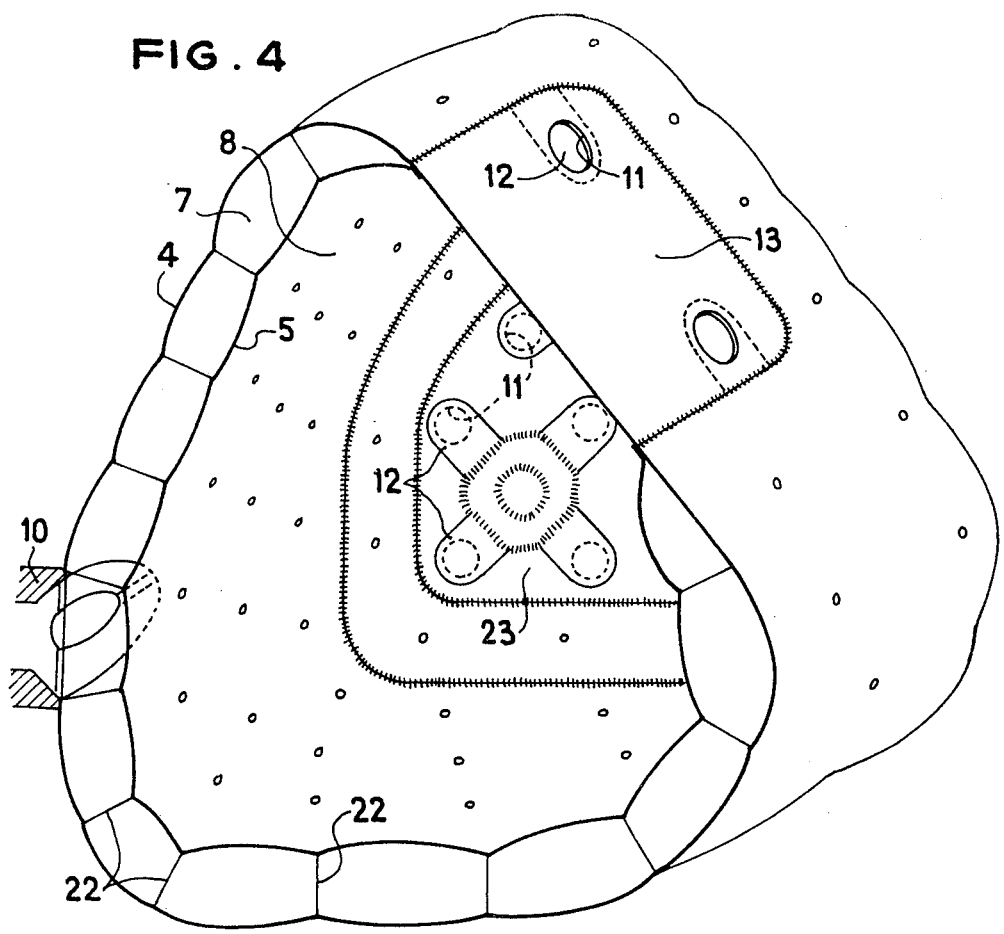
FIG. 4 is a view in perspective of a variant of the doublechamber inflatable cushion according to the invention; a longitudinal cross-section makes it possible to show the inner chamber.

FIG. 4 relates to a cushion which is designed to expand from the dashboard in order to protect the passenger in the front seat, but it can be adapted, by a simple change of shape, for the protection of a passenger in the back seat. The substantially cylindrical outer wall 4 and inner wall 5 are connected to one another, in a discontinuous manner, by elastic cords 22 in order to keep the two walls apart. Two end panels 23, attached to the ends of the said walls, close the cushion and isolate the inner chamber 8 from the outer chamber 7, whilst forming the positions on which the temporary orifices of large cross-section 11 with their membrane valves 12 are grouped. The zone 13 of the cushion which will come into contact with the head of the person to be protected also consists of a leakproof contact zone between the two walls, and temporary air inlet orifices, equipped with their membrane valves, are located in this contact zone. Opposite the diffuser 10, the elastic cords 22 are doubled and the separation of these discontinuous bonds is decreased in order to counterbalance the forces which develop at the time of pressurisation of the outer chamber 7.

FIG. 5 represents the production of the valves of the end panels of the above cushion. The operating conditions of the valve 12 necessitate a sufficient distance between the point of attachment 24 of the valve and the edge of the inlet orifice 11 in the rear portion of the valve, in order that the latter detaches itself to the maximum extent during the phase when air is admitted into the inner chamber 8. Moreover, the projecting part must be of sufficient width to provide good leakproofness during the phase of deadening the person to be protected. This FIG. 5 shows the value of producing opposing forces which act on the outer chamber, due at least to the elasticity of the inner wall 5 and also preferably due to the elasticity of the discontinuous bonding components 22. According to a preferential embodiment, the tongues forming valves 12 can be produced by a simple cutting into shape, providing a fastening 24 to the inner wall 5; by using spread-out surfaces of the same outer contour for the inner and outer walls, it is possible to work directly from rolls of starting material and complete automation of the manufacture of the cushion is possible.

Figure 6:
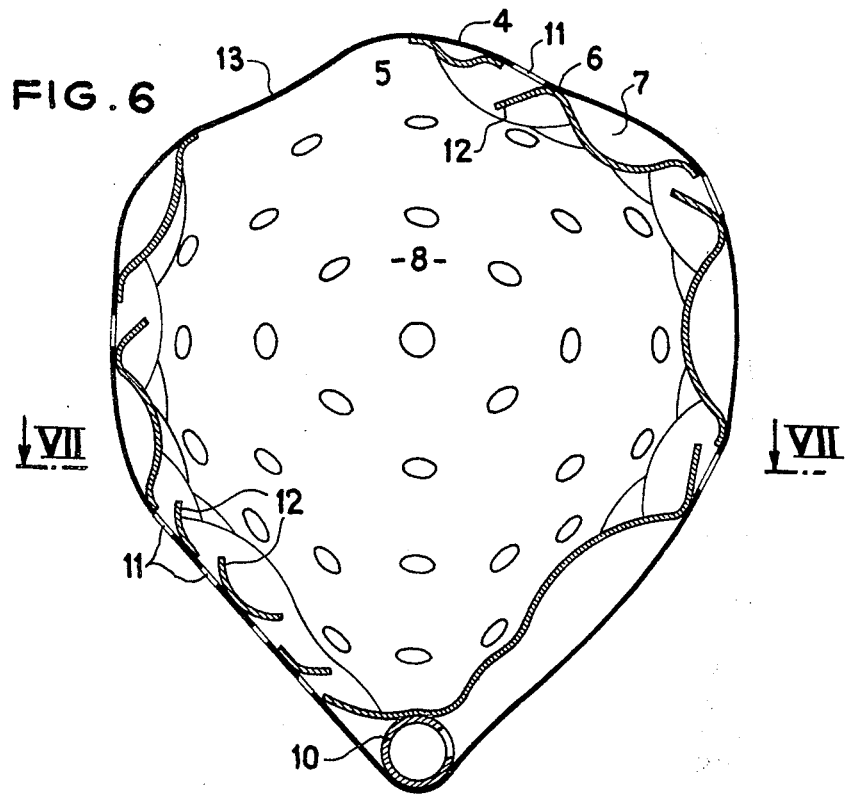
FIG. 6 is a view of another variant of the inflatable cushion represented in cross-section along VI—VI of FIG. 7.
Figure 7:
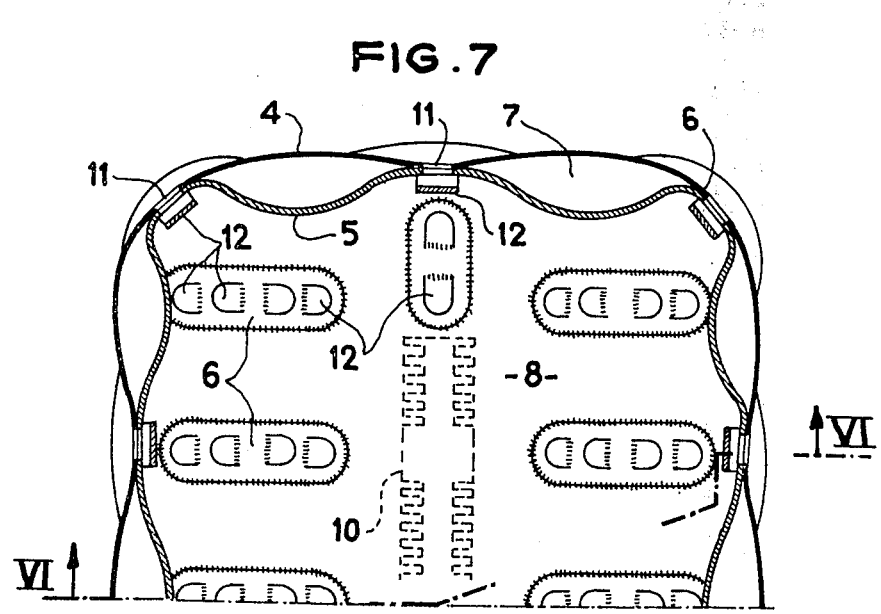
FIG. 7 is a cross-section along VII—VII of FIG. 6.

FIGS. 6 and 7 relate to a cushion designed to expand from the dashboard. The outer 4 and inner 5 walls, of substantially spherical shape and of the same dimensions, are connected, in a discontinuous manner, by leakproof contact zones 6 between the two walls, these zones being distributed over the entire surface of the cushion and containing temporary orifices 11 with membrane valves 12; the leakproof contact zones 6 are substantially ciruicular and each one carries a single temporary orifice for admitting air into a portion of the cushion (FIG. 6) or else they are elongated and each one carries several temporary orifices for admitting air (FIG. 7) into another portion of the cushion, the purpose of this arrangement being to facilitate the flow of the gases coming from the generator.

Depending on the shape of these leakproof contact zones, the outer chamber consists of elementary volumes, all connected to one another, forming either a series of bulges corresponding to circular contact zones or a tubular network when the contact zones are elongated. The injection of the gas into the outer chamber 7 takes place via a cylindrical diffuser 10 equipped with a network of slits which open into the leakproof contact zones 6 opposite free passages of the outer chamber. The front part of the inner wall is advantageously attached to the diffuser which also forms a mechanical reinforcement. The elementary volumes all connected to one another forming the outer chamber are interrupted in the zone 13 for receiving the head of the person to be protected.

What is claimed is:

1. A safety device for moving vehicles, especially for automobiles, comprising a collision detector controlling the actuation of a source of gas under pressure, at least one inflatable safety cushion connected to said source of gas, said cushion comprising an inner chamber communicating with the atmosphere via orifices with valves which open only in the direction which admits air into the said chamber, and an outer chamber connected to the said source of gas under pressure and enclosing partially the inner chamber, the walls of these two chambers being arranged one inside the other and being firmly fixed to one another in a discontinuous manner, the inner wall being made of elastic material, the outer wall being made of flexible material, said chambers being adjacent and non-communicating, the outer chamber spreading out the cushion when it is pressurized, and the inner chamber being spread out by the pressurization of the outer chamber and being pressurized itself by sucking in air from the atmosphere via the inlet orifices, elastic means compressing the outer chamber, said elastic means comprising at least said inner wall, said valves having a calibration pressure less than atmospheric, whereby the pressure of the inner chamber is maintained substantially less than the pressure of the outer chamber and less than atmospheric pressure during the cushion compression phase and during the entire stage of deadening of the blow, for deadening the blow to the person to be protected, the region of the cushion coming in contact with the head of said person being a portion of one of said walls which bounds the inner chamber, whereby the head is subjected to the lower pressure of said inner chamber.

2. A safety device according to claim 1, wherein the air inlet orifices of said inner chamber are grouped in at least one leakproof contact zone formed by contact of the said walls, said zone being at the pressure of said inner chamber.

3. A safety device according to claim 2, wherein said two walls are of substantially equal dimensions.

4. The safety device according to claim 3, wherein the leakproof attachment zones are produced by welding.

5. The safety device according to claim 2 wherein said discontinuous leakproof contact zones are distributed over the entire area of the said walls, excluding the zone which receives the head of the person to be protected.

6. The safety device according to claim 2, wherein the region of the cushion which comes into contact with the head of the person to be protected is said leakproof contact zone.

7. The safety device according to claim 2, wherein at the region of the inlet of the gases under pressure, the inner wall of the cushion is equipped with mechanical reinforcements.

8. The safety device according to claim 2, wherein the outer and inner walls have spread out surfaces of the same outer contour.

9. The safety device according to claim 1, where the valves which open only in the direction to admit air into the inner chamber are membrane valves.

10. The safety device according to claim 9, wherein the orifices and the membrane valves are produced solely from shaped cut-outs in the two walls of the cushion.

11. The safety device according to claim 1, wherein said elastic means compressing the outer chamber additionally comprise fastenings which connect said two walls, said fastenings being made of elastic material.

12. The safety device according to claim 11 wherein said fastenings are of very short length and the two walls are in direct contact with one another.

13. The safety device according to claim 1 wherein said elastic means compressing the outer chamber additionally comprise partitions which connect said two walls, said partitions being made of elastic material.

14. The safety device according to claim 1 wherein said valves which admit air into said inner chamber are substantially planar.

* * * * *